United States Patent
Campbell et al.

(10) Patent No.: US 8,424,684 B2
(45) Date of Patent: Apr. 23, 2013

(54) MULTI-DIAMETER DISC ASSEMBLY FOR MATERIAL PROCESSING SCREEN

(75) Inventors: Dane Campbell, Eugene, OR (US); Chris Parr, Eugene, OR (US); Steve Miller, Eugene, OR (US)

(73) Assignee: Emerging Acquisitions, LLC., Eugene, OR (US)

( * ) Notice: Subject to any disclaimer, the term of this patent is extended or adjusted under 35 U.S.C. 154(b) by 166 days.

(21) Appl. No.: 12/616,521

(22) Filed: Nov. 11, 2009

(65) Prior Publication Data
US 2011/0108467 A1    May 12, 2011

(51) Int. Cl.
*B07B 13/00* (2006.01)
(52) U.S. Cl.
USPC ............ 209/671; 209/643; 209/667; 209/672
(58) Field of Classification Search ............... 209/659, 209/660, 663, 667, 673, 674, 930
See application file for complete search history.

(56) References Cited

U.S. PATENT DOCUMENTS

| | | |
|---|---|---|
| 1,899,737 A | 2/1933 | Ulrich |
| 4,901,864 A | 2/1990 | Daugherty |
| 6,250,478 B1 * | 6/2001 | Davis ........................ 209/672 |
| 6,318,560 B2 * | 11/2001 | Davis ........................ 209/672 |
| 6,371,305 B1 * | 4/2002 | Austin et al. .............. 209/672 |
| 6,460,706 B1 * | 10/2002 | Davis ........................ 209/672 |
| 7,434,695 B2 * | 10/2008 | Visscher et al. ........... 209/643 |
| 7,549,544 B1 | 6/2009 | Currey |
| 7,578,396 B1 * | 8/2009 | Garzon ...................... 209/667 |
| 2006/0226054 A1 * | 10/2006 | Bishop, Jr. ................. 209/667 |

FOREIGN PATENT DOCUMENTS

| | | |
|---|---|---|
| BE | 558516 | 3/1960 |
| DE | 2751562 | 5/1979 |
| DE | 102004058898 | 6/2006 |
| FR | 2674776 | 10/1992 |

OTHER PUBLICATIONS

European Patent Office, "European Search Report" for EP10190774.9, dated Aug. 30, 2012, 8 pages.

* cited by examiner

*Primary Examiner* — Terrell Matthews
(74) *Attorney, Agent, or Firm* — Stolowitz Ford Cowger LLP

(57) ABSTRACT

A material separation screen includes multiple shafts mounted on a frame. Multi-diameter disc assemblies are mounted on the shafts and are configured to rotate and separate out different types of materials from a material stream. The multi-diameter disc assemblies include spacer discs that separately interlock together around the shafts. Compound discs are separately attached to the shafts next to the spacer discs. The spacer discs are made from a harder material than the compound discs to reduce spacer disc wear and to reduce the amount of material needed for fabricating the multi-diameter disc assembly.

25 Claims, 9 Drawing Sheets

MULTI-DIAMETER DISC ASSEMBLY FOR MATERIAL PROCESSING SCREEN

FIELD OF THE INVENTION

This invention relates to disc and disc screens for separating materials.

BACKGROUND

Disc screens are used in the materials handling industry for screening large flows of materials and removing certain items of desired dimensions. In particular, disc screens are used for classifying what is normally considered debris or residual materials. The debris may consist of soil, aggregate, asphalt, concrete, wood, biomass, ferrous and nonferrous metal, plastic, ceramic, paper, cardboard, or other products or materials recognized as debris throughout consumer, commercial and industrial markets.

In some applications, certain types of recyclable Municipal Solid Waste (MSW) are separated from other types of recyclable and/or non-recyclable waste. For example, paper, Old Corrugated Cardboard (OCC), and other fiber materials can be separated from plastic and metal containers. The discs in the screen are all driven to rotate in a common direction and are aligned at an inclined angle from an in-feed end of the screen bed to an out-feed or discharge end of the screen bed. The paper and cardboard is carried by the discs up the screen and over the out-feed end. The plastic and metal containers either roll down the back in-feed end of the disc screen or fall through InterFacial Openings (IFOs) as the containers are being carried up the disc screen.

DETAILED DESCRIPTION

Recyclable Municipal Solid Waste (MSW) includes, but is not limited to, fiber material such as newspaper, mixed paper, Old Corrugated Cardboard (OCC), other cardboard and office paper products. The term MSW refers to any single stream materials and any other type of recyclable materials or recyclable material streams. The MSW can also include relatively light plastic containers, aluminum containers, tin containers and other containers or materials with two or three dimensional shapes. Some of the MSW can be used for making new products that may use the same material as the recycled items. For example, the paper and cardboard fiber material can be re-pulped to make new paper, cardboard or other fiber products. The recyclable MSW PolyEthylene Terephthalate (PET), High Density PolyEthylene (HDPE), PolyVinyl Chloride (PVC), or other plastic containers can be shredded and melted into new containers and other types of plastic products that may not be related to the original recovered product. For example, PET bottles can be used as fiber fill for winter jackets or as fill for mattresses. The recyclable MSW metal containers are separated out for the purpose of making new aluminum, tin, or steel products.

Figure 1:
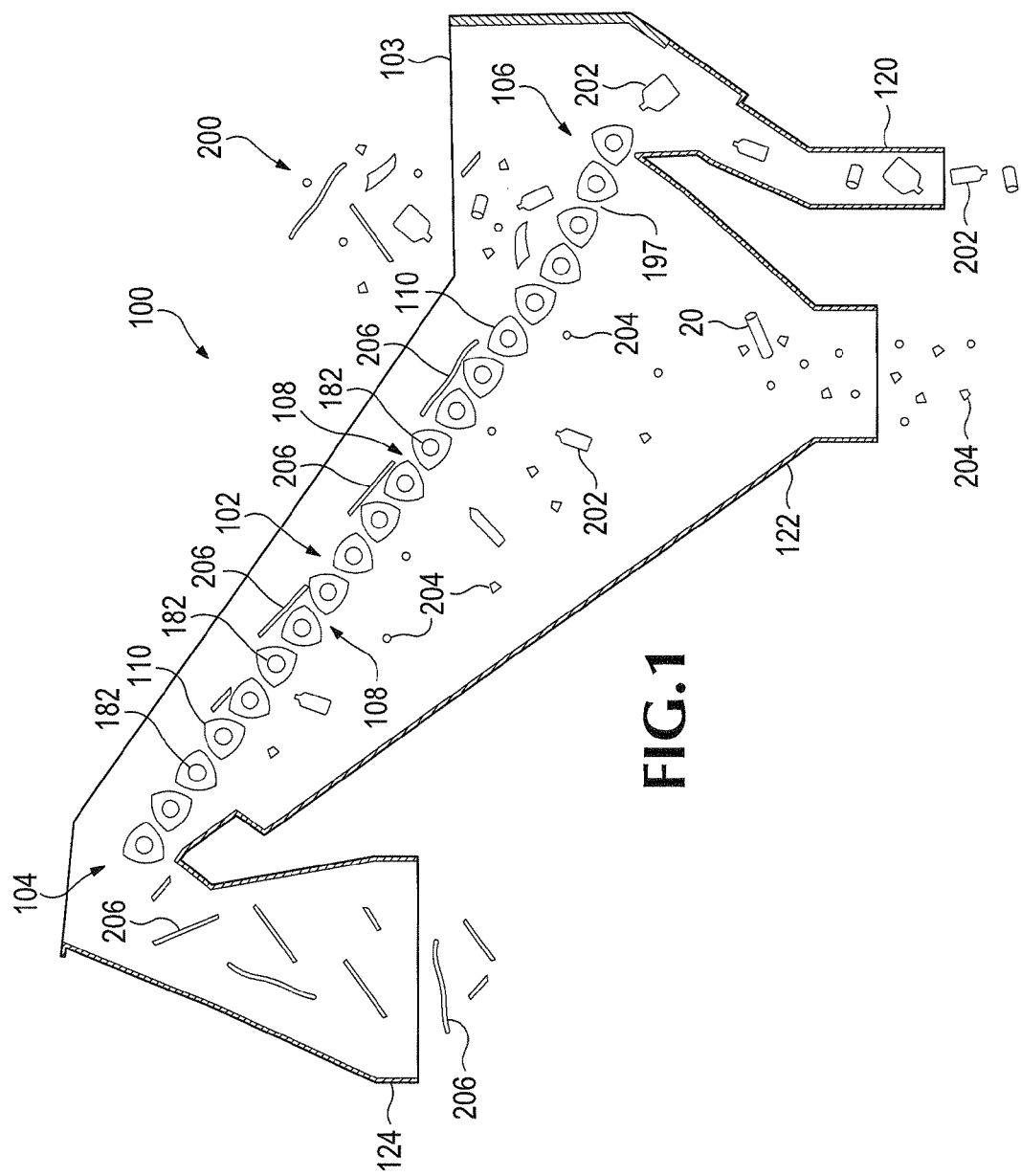
FIG. 1 is a side sectional view of a material separation system.

FIG. 1 shows a separation system 100 that separates recyclable fiber materials from other three dimension materials such as recyclable plastic and metal containers. The separation system 100 includes a frame 103 that supports a disc screen 102. The disc screen 102 includes shafts 182 that attach to the frame 103 and multi-diameter disc assemblies 110 that attach to the shafts 182 in a novel manner. The shafts 182 and disc assemblies 110 are rotated in unison by a motor (not shown). The disc screen 102 is orientated at an upwardly inclined angle from an in-feed end 106 to an out-feed end 104. A portion of the disc screen 102 is shown in more detail below in FIG. 2.

The disc screen 102 sorts recyclable items from a commingled Material Solid Waste (MSW) stream 200. Smaller objects and residue 204 typically falls through InterFacial Openings (IFOs) 108 formed between the disc assemblies 110. The objects and residue 204 drop through the disc screen 102 and into a central chute 122. Other flatter and larger fiber material 206, such as paper and OCC, are transported by the disc assemblies 110 over the top out-feed end 104 of disc screen 102 and dropped into a chute 124. Containers and other more three dimensional shaped objects 202, such as plastic and metal bottles, cans, jugs, other containers, etc. either fall through the IFOs 108 in the disc screen 102 and into chute 122 or tumble backwards off the back in-feed end 106 of the disc screen 102 into a chute 120.

Figure 2:
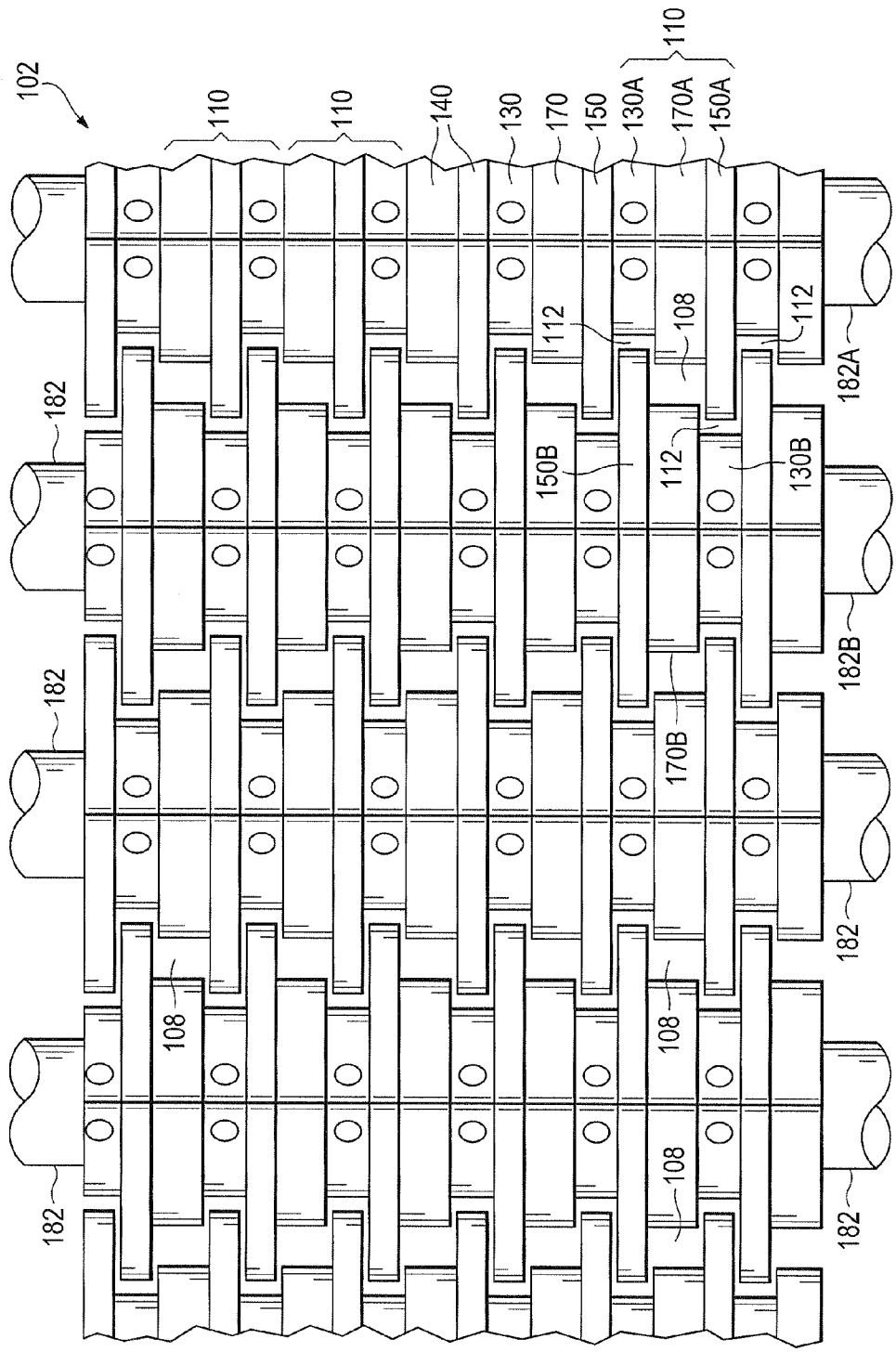
FIG. 2 is more detailed top view for of multi-diameter disc assemblies used in the material separation system shown in FIG. 1.

FIG. 2 shows a section of the disc screen 102 in more detail. Referring to both FIGS. 1 and 2, the disc screen 102 includes shafts 182 mounted to the sidewalls of frame 103 in a substantially parallel relationship. Each multi-diameter disc assembly 110 includes a small diameter spacer disc 130, a larger diameter intermediate disc 170, and an even larger diameter large disc 150. The large diameter disc 150 and an associated intermediate diameter disc 170 in the same disc assembly 110 is alternatively referred to as a compound disc 140 and in one embodiment is formed from a same unitary piece of rubber. In alternative embodiments, the compound discs 140 are made from some material other than rubber, such as steel or a relatively hard resin. In one embodiment, the compound discs 140 are formed from a different type of material than the spacer discs 130 and are mounted to the shafts 182 separately from the spacer discs 130.

The multi-diameter disc assemblies 110 are aligned laterally on the shafts 182 so that the discs assemblies on adjacent shafts 182 overlap in a stair step manner as shown in FIG. 2. For example, the large diameter disc 150A is aligned laterally on the shaft 182A with the small diameter spacer disc 130B on shaft 182B. The intermediate discs 170A and 170B are aligned with each other on adjacent shafts 182A and 182B, respectively. The small diameter spacer disc 130A on shaft 182A is aligned with the large diameter disc 150B on adjacent shaft 182B.

During rotation, the disc assemblies 110 on adjacent shafts 182 maintain a substantially constant spacing. The space between adjacent intermediate diameter discs 170A and 170B form one of the inter-facial openings (IFOs) 108 that remain substantially constant during disc rotation. The IFOs 108 allow smaller sized objects 204 to drop through the disc screen 102 while some of the material 206 is transported up the disc screen 102. The spaces between the large diameter discs 150 and small diameter spacer discs 130 on adjacent shafts 182 form secondary slots 112. The secondary slots 112 also remain at a substantially constant size during disc rotation.

The alternating alignment of the smaller spacer discs 130, large discs 150, intermediate discs 170 both laterally across each shaft 182 and longitudinally along the disc screen 102 between adjacent shafts 182 eliminate long secondary slots that would normally extend laterally across the entire width of the disc screen 102 between discs on adjacent shafts 182. Large thin materials 206, such as paper and cardboard, cannot easily pass through the secondary slots 112 or IFOs 108. This allows the materials 206 to be carried up the disc screen 102 and deposited in chute 124 with other recyclable MSW fiber materials.

In one embodiment, openings 108 are around 2 inches×2 inches but different dimensions cam be used for different material separation applications. For example, the size of IFO openings 108 can vary according to the market for the fines material 204 which can differ according to region. In other types of news sorter screens, the openings 108 may be larger, such as 3.25, 4.25, or 5.25 inches×5 inches.

Disc Wear

Referring still to FIGS. 1 and 2, the different discs 130, 150, and 170 function differently during the separation of material stream 200 and therefore exhibit different wear patterns. For example, the large diameter discs 150 extend out above the intermediate and small diameter discs 170 and 130, respectively. Accordingly, the large diameter discs 150 take on much of the task of transporting material 200 up disc screen 102.

The large diameter discs 150 also absorb much of the initial contact of the materials that are dropped and then fall back off the back end 106 of disc screen 102. For example, the 3-dimensional containers 202 in material stream 200 are dropped onto the counter-clockwise rotating large discs 150 in FIG. 1 and tumble back over the back end 106 of disc screen 102 into chute 120.

The large diameter discs also provide much of the up and down agitation of the MSW material 206 carried up the screen 102. Because of the large amount of contact with material 200, the larger discs 150 tend to have their cross sectional area reduced at a faster rate than the other smaller diameter discs 170 and 130.

As explained above, the intermediate discs form the IFOs 108 between adjacent shafts 182. The smaller diameter materials 202 fall through the IFOs 108 while being carried up screen 102. Although to a lesser extent than the large discs 150, the intermediate discs 170 also serve to transport some of the materials 206 up the screen 102 and also contact, rotate, and cause some of materials 202 to fall off the back end 106 of screen 102. The intermediate diameter disc 170 contact less of the material stream 200 than the large diameter discs 150 and therefore their cross sectional area is reduced at a slower rate than the large discs 150.

The spacer discs 130 have a smaller outside diameter than both the large discs 150 and the intermediate discs 170. Accordingly the spacer discs 130 come in much less contact with material stream 200 and transport relatively little of the material 206 up the screen 102. The primary function of the spacer discs 130 is to form the thin secondary slots 112 with the large discs 150 on adjacent shafts that are offset from the laterally adjacent IFOs 108. As explained above, the secondary slots 112 prevent relatively flat materials 206, such as paper and OCC, from dropping through the screen 102.

In some embodiments, the large discs 150 and intermediate discs 170 are made out of a softer rubber material to better grip, transport, and separate out different parts of MSW material stream 200. Rubber discs often grip MSW materials 206 better than a hard steel disc and therefore are more effective at separating the MSW material 200. One disadvantage is that the cross sectional area of the softer rubber discs may be reduced faster than harder discs.

Interlocking Spacer Discs

Figure 3:
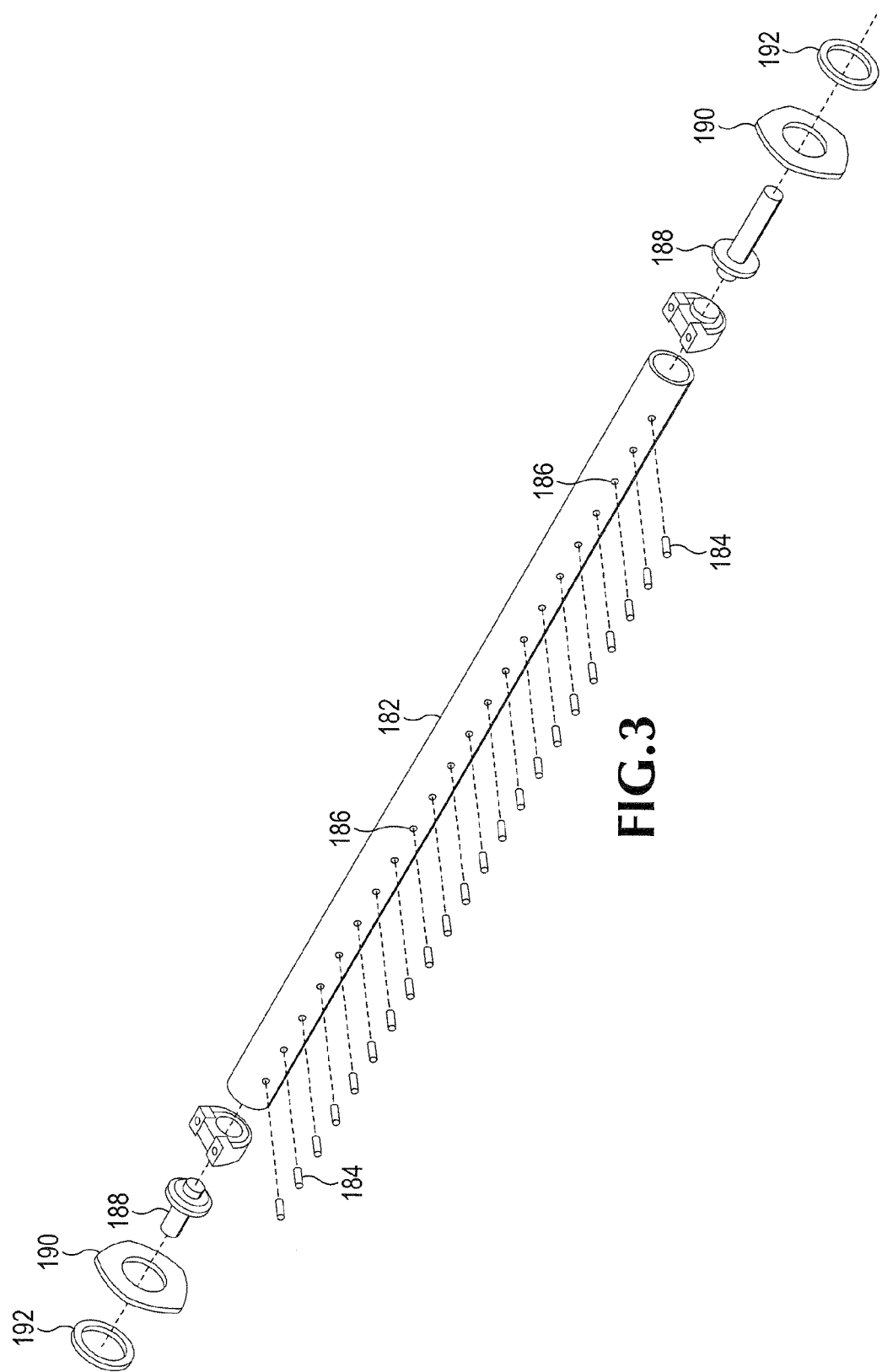
FIG. 3 is an isolation view of a shaft used in the material separation system of FIG. 1.
Figure 4:
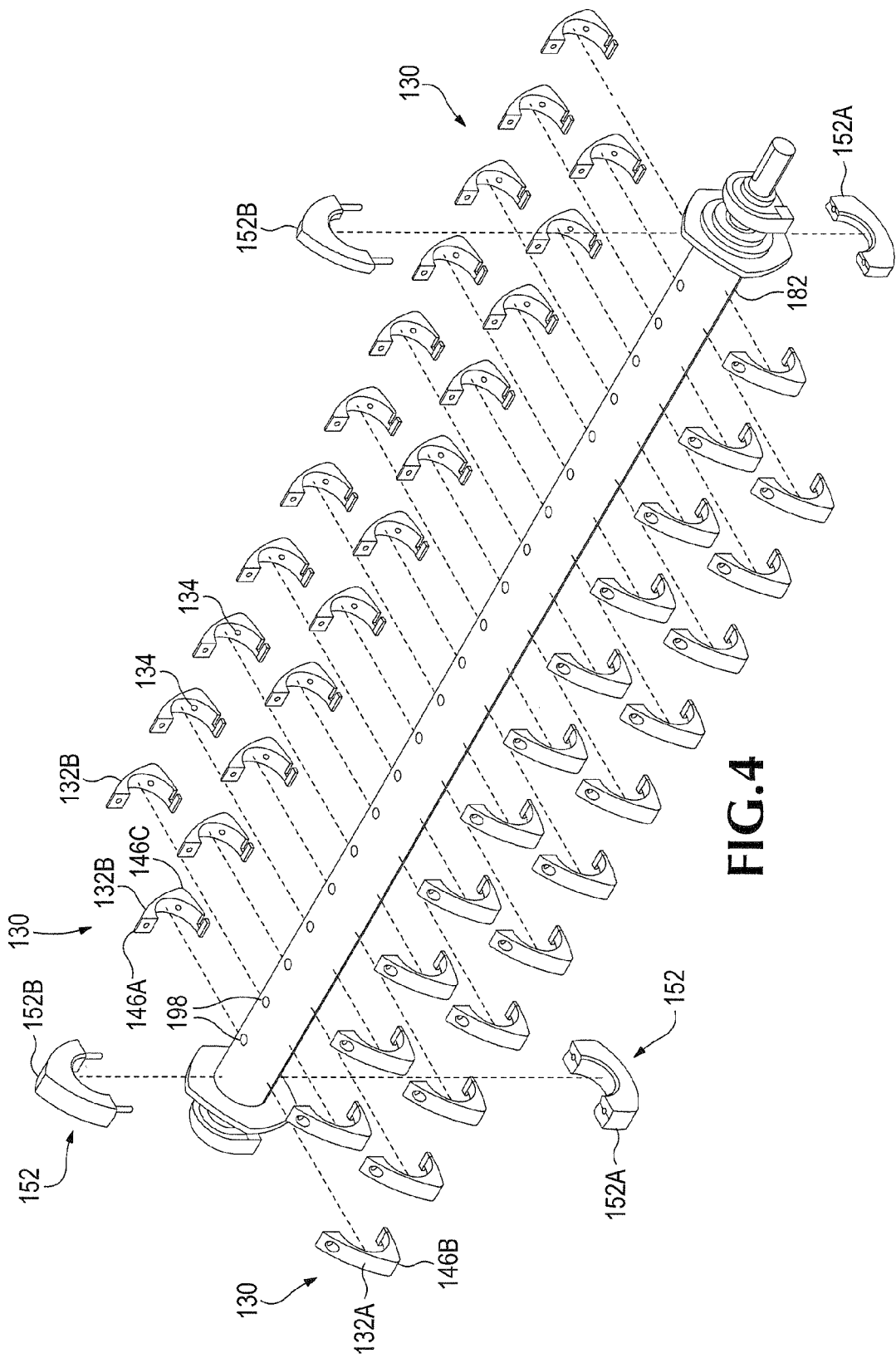
FIG. 4 shows the shaft of FIG. 3 and spacer discs used in the multi-diameter disc assemblies.
Figure 5:
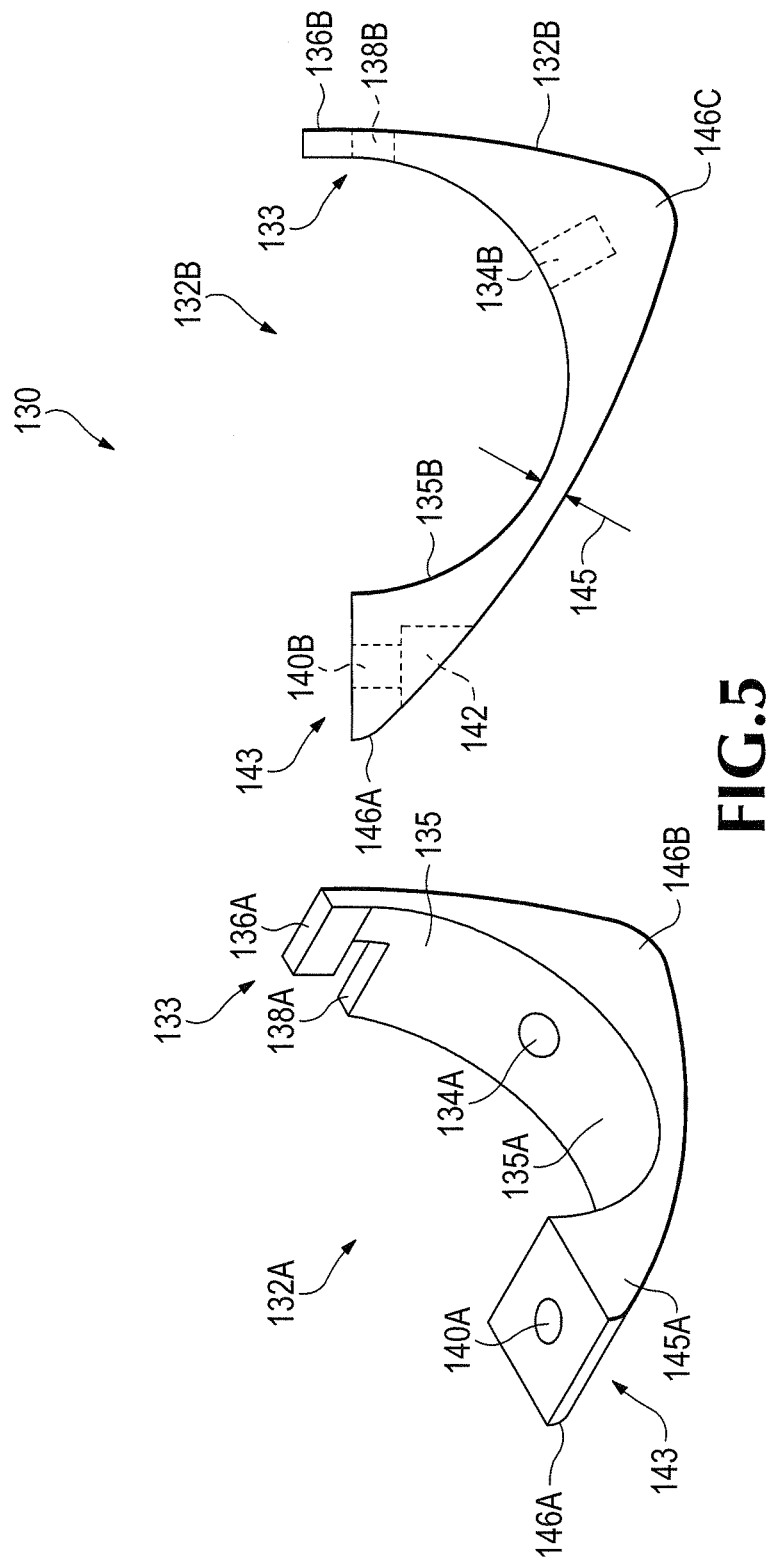
FIG. 5 shows the spacer discs of FIG. 4 in more detail.

FIGS. 3-5 show in more detail how the spacer discs 130 are separately interlocked together and attached to the shaft 182. In one embodiment, the shaft 182 is made from a round elongated steel pipe. However, other triangular or square shapes shafts can also be used. The shaft 182 is connected to the opposite walls of the screen frame 103 (FIG. 1) via gudeons 188, end plates 190 and cap plates 192.

In this embodiment, holes 186 (FIG. 3) are drilled through one side of the shaft 182 along substantially the entire shaft length. The holes 186 are positioned at the desired lateral positions on shaft 182 for locating the spacer discs 130. Key pins or spring pins 184 insert and compressibly attach into holes 186. Alternatively, dowel pins can be force fit or welded into the holes 186 or pins can be welded onto the outside surface of shaft 182.

Referring particularly to FIG. 5, in one embodiment, the spacer disc 130 comprises two sections 132A and 132B that are the exact same shape and therefore can both be made from the same mold. One of the sections 132A or 132B is turned upside down and attaches and interlocks with a corresponding end of the other section 132. The two sections 132A and 132B when attached together around shaft 182 form a symmetrical half of a triangular profile perimeter with three arched sides and three lobes 146A, 146B, and 146C.

The two sections 132A and 132B each have an inside wall 135A and 135B, respectively, that are each sized and shaped to snugly press against and around half of the outside circumference of the shaft 182. In this example, where the shaft 182 has a circular outside cross-sectional shape, the inside walls 135A and 135B each form a semi-circular shape that extends around half of the outside surface of the shaft 182.

The two sections 132A and 132B each include an interlocking end 133 and a coupling end 143. The interlocking ends 133 include notches 138A and 138B that extend perpendicular into a first side of the sections 132A and 132B, respectively. Locking members 136A and 136B extend perpendicularly from a second side of the sections 132A and 132B above the notches 138A and 138B, respectively.

One or both of sections 132A and/or 132B have a hole 134A and/or 134B formed in the inside wall 135A and/or 135B, respectively. The hole 134A and/or 134B is sized to slidingly receive one of the pins 184 that extend out of the shaft 182 as shown in FIG. 3. One of the two sections 132A or 132B is attached to the shaft 182 such that the pin 184 slidingly inserts into hole 134A or 134B. The pin 184 prevents any rotational movement of the spacer disc 130 against the shaft 182 during operation as well as guaranteeing the location of the spacer disc 130 during maintenance replacement.

The section 132A or 132B that is not attached to pin 184 is rigidly interlocked with the other section 132 currently attached to shaft 182. In this example, assume that section 132B has already been attached to the shaft 182, one of the pins 184 inserts into hole 134B, and the inside wall 135B presses and extends against half of the outside circumference of the shaft 182.

Section 134A is flipped around 180 degrees from the position shown in FIG. 5. The section 132A is then pressed against the opposite half of the outside circumference of the shaft 182 but in a lateral position on shaft 182 adjacent to spacer section 134B. Spacer section 134A is then slid over the same lateral portion of shaft 182 where section 134B is located. While sliding over section 134B, the locking member 136A in section 132A 134A inserts into the notch 138B formed in spacer section 132B. At the same time the locking member 136B in spacer section 132B slides into notch 138A formed in spacer section 132A. This interlocks the two sections 132A and 132B together at the interlocking end 133.

Figure 6:
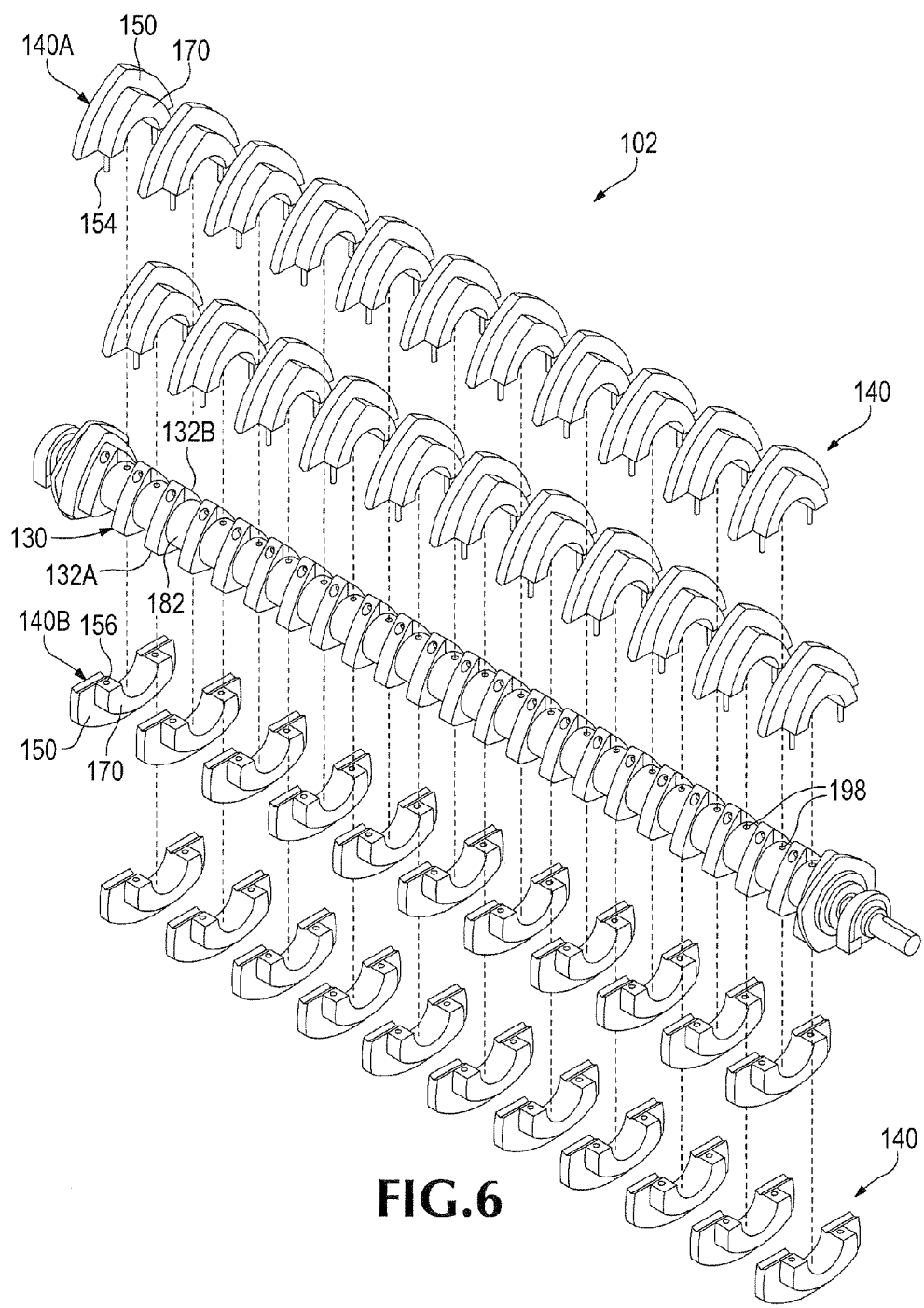
FIG. 6 shows the spacer discs of FIG. 4 attached to the shaft and compound discs shown in an exploded view.

When the two sections 134A and 134B are interlocked together, the coupling ends 143 of spacer sections 132A and 132B are positioned against each other face to face. Holes 140A and 140B are aligned with each other and form one continuously hole through lobe 146A. A bolt (not shown) is inserted into one of the cavities 142 formed in one of the spacer sections 132A or 132B, and through the two holes 140A and 140B. A threaded nut (not shown) is inserted into a similar shaped cavity 142 formed in the opposite section 132A or 132B and screwed onto the end of the bolt locking the two spacer sections 132A and 132B together as shown in FIG. 6 below.

The length of the shaft 182 and alignment of the multi-diameter disc assembly 110 may require attachment of single end discs 152 on the lateral ends of shafts 182. The end discs 152 may have the same shape as a single intermediate disc 170 or a single large diameter disc 150. The end discs 152 have two different sections 152A and 152B that attach together around the shaft 182 in a manner similar to the compound discs 140 as described in more detail below in FIGS. 6 and 7.

As explained above, the smaller diameter spacer discs 130 do not transport much of materials 206 up the disc screen 102 (FIG. 1). Therefore, in one embodiment, the spacer discs 130 are made out of a harder less gripping material than the compound discs 140. For example, the spacer discs 130 can be made from a relatively hard fiberglass, polymer, nylon, or metal material, while the compound discs 140 are made out of a substantially softer rubber material. In one example, the spacer discs 130 can be made from a polyphthalamide (aka. PPA, High Performance Polyamide) which is a thermoplastic synthetic resin of the polyamide (nylon) family.

The spacer discs 130 can not only be made from a harder material than the rubber compound discs 140 but can also be separately attached to the shaft 182. Thus, the compound discs 140 can be replaced without also having the replace the spacer discs 130. In other tri-disc designs, all three discs are formed from the same piece of rubber material. Thus, whenever the large and/or intermediate discs wear out, smaller discs also have to be replaced.

Using a harder material for the smallest diameter spacer discs 130 also allows the use of larger diameters shafts 182 that reduce the overall amount of material needed for the multi-diameter disc assembly 110. Referring to FIG. 5, the spacer discs 130 have the smallest outside diameter of the three discs 130, 150 and 170. Therefore, the spacer discs 130 will have the smallest material thickness between the outside surface of the shaft 182 and the smallest outside perimeter of the spacer disc 130 at locations 145.

A minimum material thickness is necessary at locations 145 to keep the spacer disc 130 from tearing apart. Using materials that are harder and more wear resistant than rubber allow the spacer discs 130 at locations 145 to be much thinner. This allows the use of larger diameter shafts 182, resulting in larger center holes 172 (FIG. 7C) in the multi-diameter disc assemblies 110, and the use of less material in the multi-diameter disc assemblies 110. Thus, the costs of manufacturing and shipping the multi-diameter discs 110 are reduced.

Compound Discs

Figure 7A:
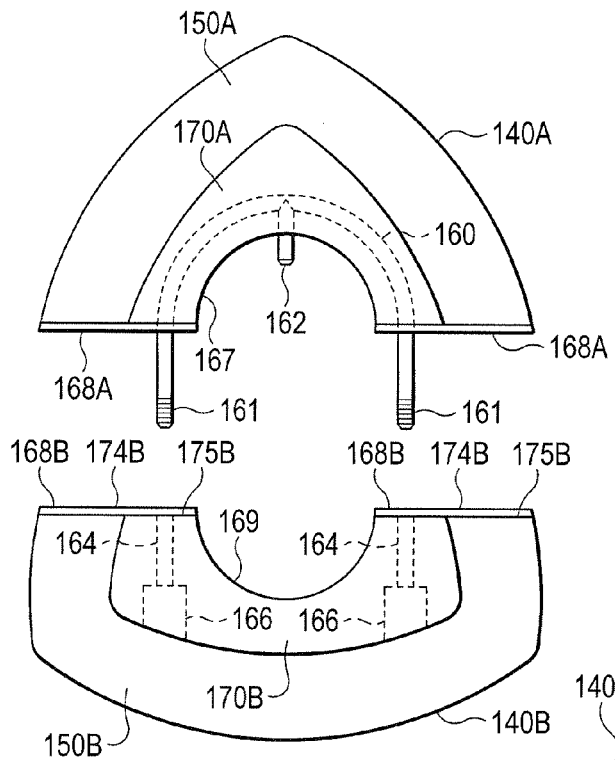
FIGS. 7A-7C shows the compound discs in more detail.
Figure 7B:
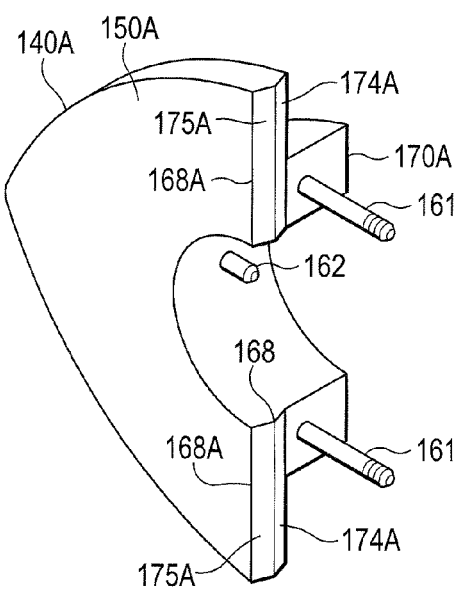
Figure 7C:
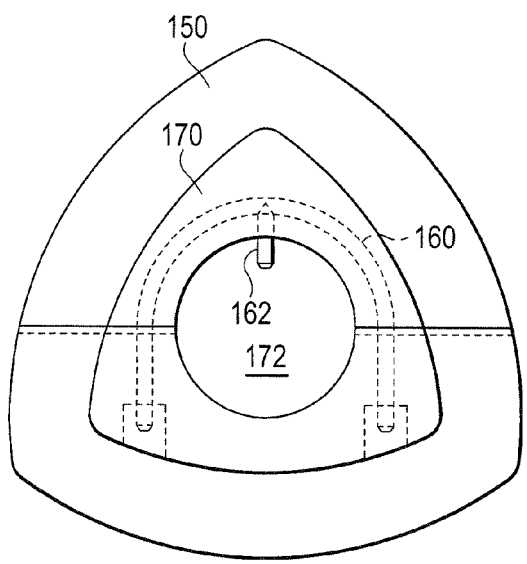

FIG. 6 shows an isolated view of one row of the disc screen 102 with the spacer discs 130 attached to the shaft 182 and the compound discs 140 shown in an exploded view. FIGS. 7A-7C show one embodiment of the compound discs 140 in more detail. As described above, the compound discs 140 are formed from a separate piece of material than the spacer discs 130. Forming the spacer discs 130 and compound discs 140 out of separate pieces of material allow the compound discs 140 to be separately replaced while the spacer discs 130 remain attached to the shafts 182.

Each of the separate discs can have any variety of different shapes, sizes, and number of sides. Discs with different combinations of shapes, sizes, and number of sides can also be combined together. For example, a three sided triangular disc could be combined with a four sided square shaped disc in the same compound disc.

The compound discs 140 include an upper section 140A and a lower section 140E that connect together around the shaft 182. The lower compound disc section 140B includes a lower large disc portion 150B that is integrally formed with a lower intermediate disc portion 170B from a same piece of material. Holes 164 extend through opposite ends of the lower intermediate disc portion 170B. An inside wall 169 of the lower compound disc section 140B has a semi-circular shape that snugly presses around half of the outside circumference of the shaft 182.

The upper compound disc section 140A includes a large disc portion 150A and intermediate disc portion 170A that are both integrally formed together from the same piece of material. A U-bolt 160 is molded into the intermediate disc portion 170A and has opposite ends 161 that extend out from opposite ends 168A of the compound disc section 140A. A locating pin 162 is located at the center of the U-bolt 160 and extends out from an internal wall 167. The inside wall 167 of the upper compound disc section 140A also has a semi-circular shape that snugly attached around a second half of the circumference of the shaft 182.

The locating pin 162 is inserted into one of the holes 198 in shaft 182 shown in FIG. 4 and prevents the compound disc 140 from sliding against the shaft 182. The inside surface 167 is pressed down against the upper half of the shaft 182 so that the opposite ends 161 of the U-bolt 160 extend on opposite sides of the shaft 182.

The lower compound disc section 140B is pressed underneath a bottom end of the shaft 182 so that the ends 161 of U-bolt 160 insert into holes 164. The inside surface 169 of lower section 140B is up pressed against the lower outside surface of the shaft 182 while the opposite ends 168A and 168B of the upper and lower compound disc sections 140A and 140B, respectively press against each other.

The opposite ends 168A of the upper section 140A have a flat surface 174A (FIG. 7B) and an inclined surface 175A. The opposite ends 168B of the lower section 140B also have a flat surface 174B and an upwardly inclined surface 175B oppositely opposed with surfaces 174A and 175A, respectively. The surfaces 174A and 174BA and surfaces 175A and 175B press against each other when the two sections 140A and 140B are pressed against the shaft 182.

When the two sections 140A and 140B are fully attached together, the ends 161 of U-bolt 160 extend through holes 164 and into the openings 166 formed in intermediate disc portion 170B. Nuts (not shown) are inserted into openings 166 and screwed onto the ends 161 of U-bolt 160 holding the two sections 140A and 140B of the compound disc 140 tightly together and tightly against the shaft 182. The compound discs 140 when fully assembled as shown in FIG. 7C having a triangular profile with three arched sides and a circular center hole 172.

Alternative Disc Designs

Each of the discs 130, 150, and 170 of the multi-diameter disc assembly 110 as shown above has three arched sides and a triangular profile. However, the multi-diameter discs 110 could have any number of arched sides and any number of different diameter discs. For example, the multi-diameter disc assembly 110 could have four or five different discs with different diameters. Any of the different disc diameters can be separately formed from separate pieces of material with different hardness depending on screen wear and material gripping requirements.

The intermediate discs 170 and large discs 150 could also be formed from separate pieces of material and separately attached to the shaft 182. For example, separate discs similar to the end discs 152 previously shown in FIG. 4 could be formed for each intermediate and large diameter disc 170 and 150, respectively. In this embodiment, each intermediate disc 170 and large diameter disc 150 would have a U-bolt 160 formed in an upper section that separately inserts into holes formed in a corresponding lower section.

The spacer discs 130 could be made from a hardest material, since they do not provide the primary surface for material transport and agitation. The intermediate discs 170 could be made from a medium material hardness, since these discs provide an intermediate amount of material transport. The large diameter discs 150 could be formed of an even softer rubber material compared with discs 130 and 170, since the large diameter discs 150 need to provide most of the material transport and agitation.

Any combination of the discs 130, 150, and 170 may be formed from metal, rubber, polyphthalamide, polymer, or nylon material as described above. Any combination of the discs 130, 150, and 170 could also use the same interlocking system used by the spacer discs 130. Other attachment mechanisms could also be used.

Figure 8:
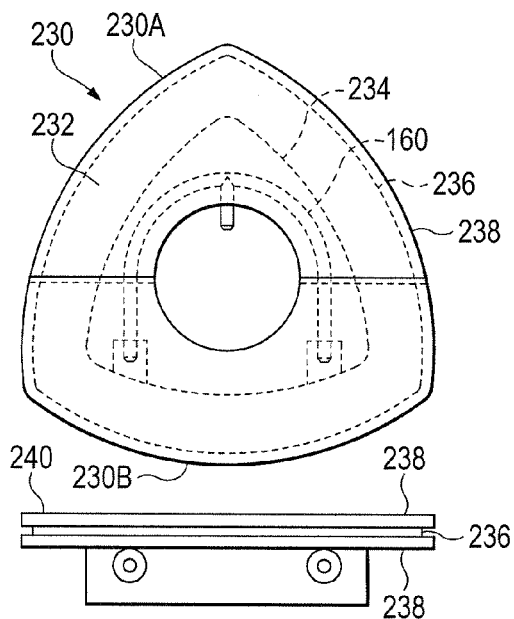
FIGS. 8-11 show alternative tread designs formed on the compound discs.

Referring to FIGS. 8-11, the multi-diameter disc assemblies can also use different tread designs. For example, FIG. 8 shows a compound disc 230 similar to the compound disc 140 described above that includes an intermediate disc 234, a large disc 232, and upper and lower compound disc sections 230A and 230B that attach around the shaft 182 of the disc screen 102 shown in FIG. 1. A channel 236 is formed into an outside perimeter surface of the large diameter disc 232. The channel 236 effectively forms a tread of two parallel ribs 238 that extend above and around opposite sides of the entire outside perimeter of the large diameter disc 232. This tread design can more effectively grip and transport certain types of material up disc screen 109 (FIG. 1) for more efficient material separation.

Figure 9:
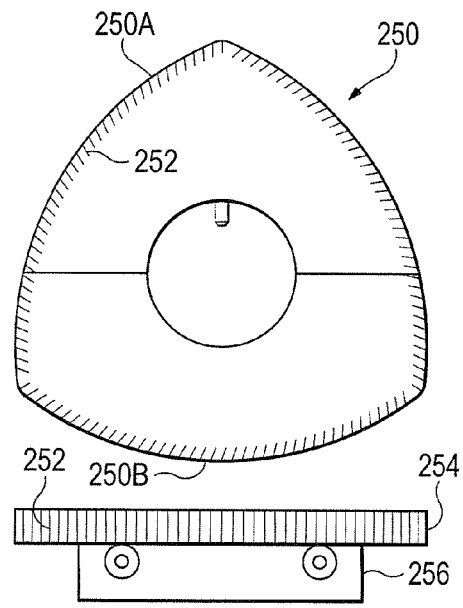

FIG. 9 shows a compound disc 250 with similar shapes as the compound disc 140 described above that includes intermediate disc 256, large disc 254, and upper and lower sections 250A and 250B that attach together around the shaft 182. The compound disc 250 has an alternative tread design that comprises slits or sipping 252 that are cut in diagonal directions with respect to the outside surface of large disc 254.

The slits or sipping 252 may extend any distance from the outside surface toward the center of disc 254. In one example, the slits or sipping 252 may extend anywhere from around 0.1 inches to 0.5 inches into the surface of disc 254. In one embodiment, the slits 252 incline in a direction of disc rotation. This provides a serrated rough outside perimeter surface that improves the ability of the disc 254 to grip and carry materials up the disc screen 102.

Figure 10:
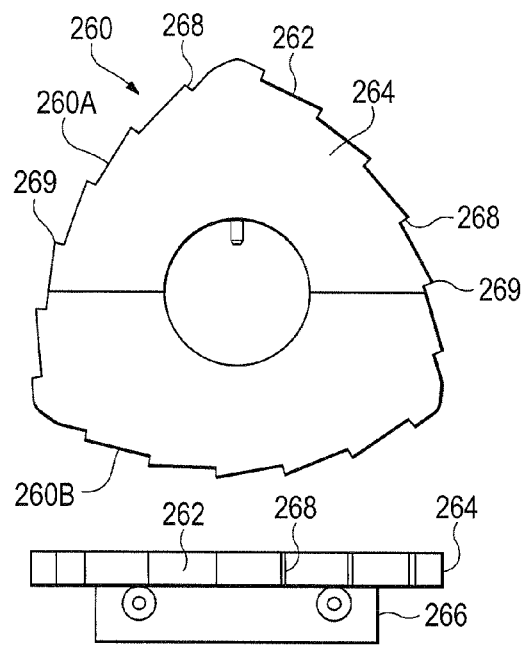

FIG. 10 shows a compound disc 260 having a shape similar to compound disc 140 that includes both an upper section 260A and a lower section 260B that attach together around the shaft 182. The compound disc 260 includes large diameter disc 264 and intermediate diameter disc 266. The compound disc 260 has a saw tooth shaped tread 262. The saw tooth treads 262 form notches 268 with oppositely inclining surfaces that form teeth 269. The teeth 269 provide sharply angled edges on the large diameter disc 264 that can hook, grab, and pull material up the disc screen 102 (FIG. 1).

Figure 11:
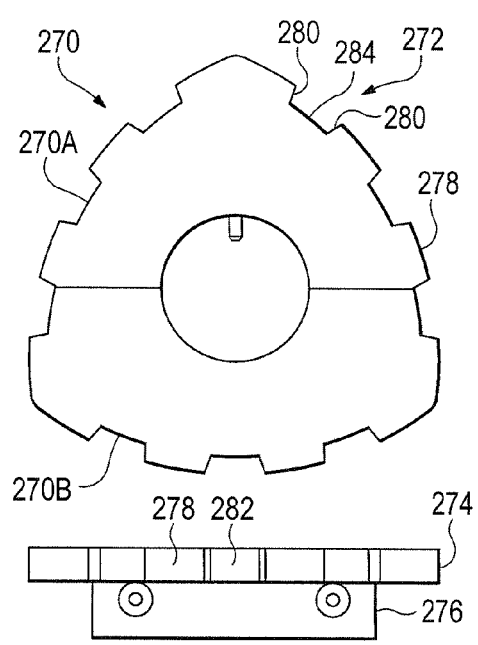

FIG. 11 shows a compound disc 270 that includes both an upper section 270A and a lower section 270B that attach together around the shaft 182 of disc screen 102. The compound disc 270 includes large diameter disc 274 and intermediate diameter disc 276 that have shapes similar to the discs on the compound disc 140. The tread for compound disc 270 has rectangular shaped protuberances or knobs 278 and notched channels 272 having an arched convex shaped bottom surface 284 and oppositely inclining side walls 280. The knobs 278 and notched channels 272 provide multiple angled corners on the outside surface of the disc 274 that grip, carry, and separate the MSW materials.

The different tread designs shown in FIGS. 8-11, in addition to the relatively slick tread described in FIGS. 3-7 can be used for different material separation applications or conditions. For example, one of the tread design shown in FIGS. 1-7 may be better in warmer or drier material conditions. Another one of the tread designs in FIGS. 8-11 may be better in colder or wetter material conditions. The different tread designs can also provide different separation efficiency for different types of materials streams. For example, the relatively slick outside surface of the multi-diameter disc assembly 110 shown in FIGS. 3-7 may be more efficient at separating out relatively flat fiber material, where one of the alternative tread designs shown in FIGS. 8-11 may provide more efficient material separation for 3-dimensional materials or slippery materials.

The different tread designs as described above can be used at different locations of the same disc screen 102. For example, one of the tread designs shown in FIGS. 8-11 may be used on the back end 106 of disc screen 102 in FIG. 1, while the flat surface of the disc assembly 110 shown in FIGS. 3-7 may be use in the middle or top end 104 of the disc screen 102 shown in FIG. 1. Further, the disc assemblies used in different modular sections of the same screen 102 as described below in FIG. 12 may each use different tread designs according to the particular separation application or stage.

Modular Separation Screen

Figure 12:
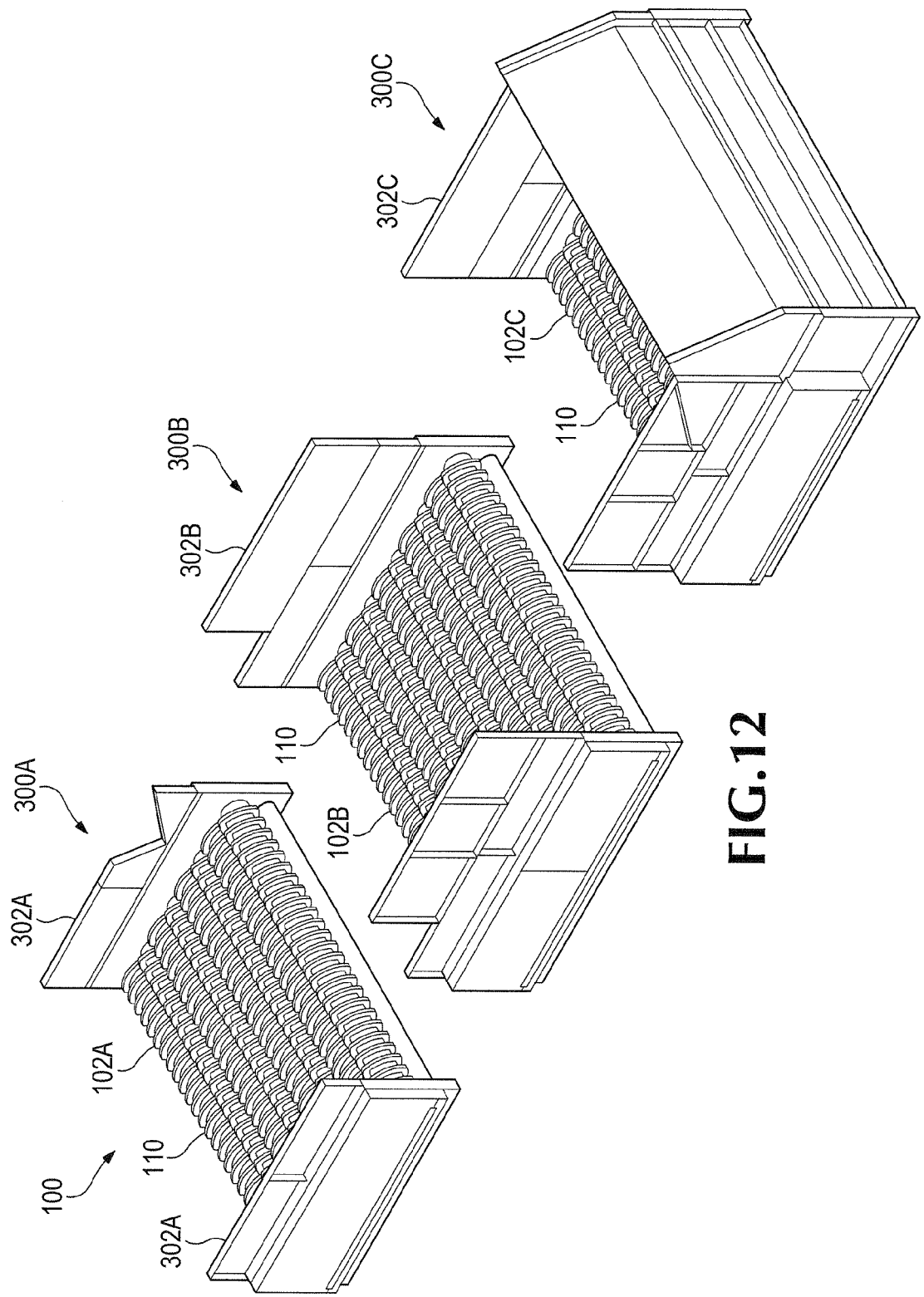
FIG. 12 shows a modular material separation system.

FIG. 12 shows one embodiment of the separation system 100 that is formed from multiple different modular sections 300A, 300B, and 300C that are each separately attached together via bolts. Each modular screen section 300A, 300B, and 300C includes separate frames 302A, 302B, and 302C, respectively that support a separate screen section 102B, and 102C, respectively. In one embodiment, each screen section 300 may have a separate motor that separately controls the rotation speed of the discs 110 in the particular screen section 300. Any number of modular separation system sections 300A, 300B, and 300C can be bolted together depending on the length of the screen needed for a particular material separation application. The modular screen sections 300 allow easier shipping, assembly, and replacement of separation systems 100.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A multi-diameter disc assembly, comprising:
a first disc having a first diameter, wherein the first disc is configured to prevent materials from falling through a disc screen, and wherein the first disc comprises:
a first section having a first interlocking end and a first coupling end, wherein the first interlocking end of the first section includes a first notch extending perpendicular into a first side of the first section and a first locking member that extends from a second side of the first section above the first notch; and
a second section having a second interlocking end that interlocks with the first interlocking end and a second coupling end that couples to the first coupling end, wherein the second interlocking end of the second section includes a second notch extending perpendicular into a first side of the second section and configured to slidingly receive the first locking member and a second locking member that extends from a second side of the second section above the second notch and configured to slidingly insert into the first notch; and
a second disc having a second diameter larger than the first diameter, wherein the second disc is configured to prevent some of the materials from falling through the disc screen.

2. The disc assembly according to claim 1 wherein the first disc comprises an exterior contact surface formed from a first substance, wherein the second disc comprises an exterior contact surface formed from a second substance softer than the first substance, and wherein the second substance is configured to better grip and transport some of the materials up the disc screen.

3. The disc assembly according to claim 1 wherein the first section and the second section each have a same shape each forming a symmetrical half of the first disc.

4. The disc assembly according to claim 1 including holes extending completely through both the first and second coupling end that align when the first and second interlocking ends of the first and second sections are slidingly interlocked together, wherein the aligned holes are configured to receive a bolt for bolting the first and second coupling end together.

5. The disc assembly according to claim 1 further comprising a hole extending partially into an interior wall for one of the first and second sections of the first disc, the hole configured to receive a pin extending out from a disc screen shaft.

6. The disc assembly according to claim 2 including a third intermediate disc that includes a first side that abuts up against a side of the first disc and a second side that abuts up against a side of the second disc, wherein the third disc has a third diameter larger than the first diameter of the first disc and smaller than the second diameter of the second disc.

7. The disc assembly according to claim 6 wherein the first disc, second disc, and third disc are all separately attachable to the screen shaft.

8. The disc assembly according to claim 6 wherein upper and lower sections of the second disc and the third disc are each integrally formed from unitary pieces of the second material.

9. The disc assembly according to claim 1 including a channel extending into and around an outside perimeter surface of the second disc.

10. The disc assembly according to claim 1 including slits or sipping formed into and around an outside perimeter surface of the second disc.

11. The disc assembly according to claim 1 including notches formed into and around an outside perimeter surface of the second disc, wherein the notches have a substantially arched bottom surface and oppositely inclining side walls.

12. A multi-diameter disc assembly, comprising:
means for preventing materials from falling through a disc screen comprising a first disc having a first diameter; and
means for transporting some of the materials up the disc screen comprising a second disc having a second diameter larger than the first diameter, wherein the second disc comprises:
a first section configured to attach around a first portion of a shaft, wherein the first section includes a first interlocking end and a first coupling end; and
a second section configured to attach around a second portion of the shaft, wherein the second section includes a second interlocking end that slidingly interlocks with the first interlocking end and a second coupling end that couples to the first coupling end of the first section, and wherein the first and second section are configured to form multiple arched sides when attached together around the shaft.

13. The multi-diameter disc assembly according to claim 12 wherein:
the first interlocking end of the first section includes a first notch extending perpendicular into a first side of the first section and a first locking member that extends perpendicular from a second side of the first section above the first notch; and
the second interlocking end of the second section includes a second notch extending perpendicular into a first side of the second section and configured to slidingly receive the first locking member, and a second locking member that extends perpendicular from a second side of the second section above the second notch configured to slidingly insert into the first notch.

14. The multi-diameter disc assembly according to claim 13 including holes extending completely through the first and second coupling ends of the first and second sections that align when the first interlocking end of the first section is slidingly interlocked with the second interlocking end of the second section, wherein the aligned holes are configured to receive a bolt for bolting the first and second sections together.

15. The multi-diameter disc assembly according to claim 12 wherein the first section and the second section each have a same shape each forming a symmetrical half of the disc.

16. The multi-diameter disc assembly according to claim 12 wherein the second disc is configured to be positioned on the disc screen adjacent to the first disc.

17. The multi-diameter disc assembly according to claim 16 wherein the first disc and the second disc are configured to be separately attached to the disc screen, and wherein the second disc abuts up against a side of the first disc after being separately attached to the disc screen.

18. The multi-diameter disc assembly according to claim 12 including a third disc having a third diameter larger than the first diameter and smaller than the second diameter, wherein the third disc is positioned on the disc screen between the first disc and the second disc, and wherein the third disc is formed from a third substance softer than the first substance and harder than the second substance.

19. The disc assembly according to claim 2 wherein the first disc comprises a unitary piece of the first substance, and wherein the second disc comprises a unitary piece of the second substance.

20. The disc assembly according to claim 1 wherein the second disc is configured to be positioned on the disc screen adjacent to the first disc.

21. The disc assembly according to claim 1 wherein the first disc and the second disc are configured to be separately attached to the disc screen, and wherein the second disc abuts up against a side of the first disc after being separately attached to the disc screen.

22. The disc assembly according to claim 2 including a third disc having a third diameter larger than the first diameter and smaller than the second diameter, wherein the third disc is positioned on the disc screen between the first disc and the second disc, and wherein the third disc is formed from a third substance softer than the first substance and harder than the second substance.

23. The disc assembly according to claim 2 wherein the first substance used in the first disc is a harder polyphthalamid, polymer, nylon, or steel material and the second substance used in the second disc is softer rubber.

24. The multi-diameter disc assembly of claim 12 wherein an exterior contact surface of the first disc comprises a first substance, and wherein an exterior contact surface of the second disc comprises a second substance softer than the first substance.

25. A materials separation disc assembly, comprising: a first section configured to attach around a first portion of a shaft, wherein the section comprises:
 a first interlocking end including a first notch extending perpendicular into a first side of the first section and a first locking member that extends from a second side of the first section; and
 a first coupling end; and
a second section configured to attach around a second portion of the shaft, wherein the second section comprises:
 a second interlocking end including a second notch extending perpendicular into a first side of the second section that slidingly interlocks with the first interlocking end, and a second locking member that extends from a second side of the second section and is configured to slidingly insert into the first notch; and
a second coupling end that couples to the first coupling end of the first section, wherein the first and second section are configured to form multiple arched sides when attached together around the shaft.

* * * * *

UNITED STATES PATENT AND TRADEMARK OFFICE
CERTIFICATE OF CORRECTION

PATENT NO. : 8,424,684 B2
APPLICATION NO. : 12/616521
DATED : April 23, 2013
INVENTOR(S) : Dane Campbell et al.

Page 1 of 1

It is certified that error appears in the above-identified patent and that said Letters Patent is hereby corrected as shown below:

In the Claims:
Column 12, line 6 (Claim 25): After "wherein the" insert --first--.

Signed and Sealed this
Eighth Day of October, 2013

Teresa Stanek Rea
*Deputy Director of the United States Patent and Trademark Office*